Sept. 19, 1933.  H. CHRISTENSEN ET AL  1,927,488
WHEEL GAUGING DEVICE
Filed Jan. 16, 1931    2 Sheets-Sheet 1
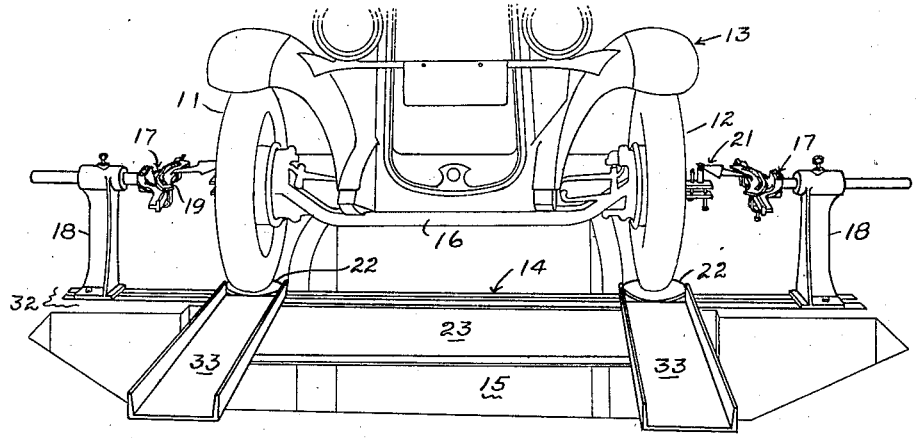
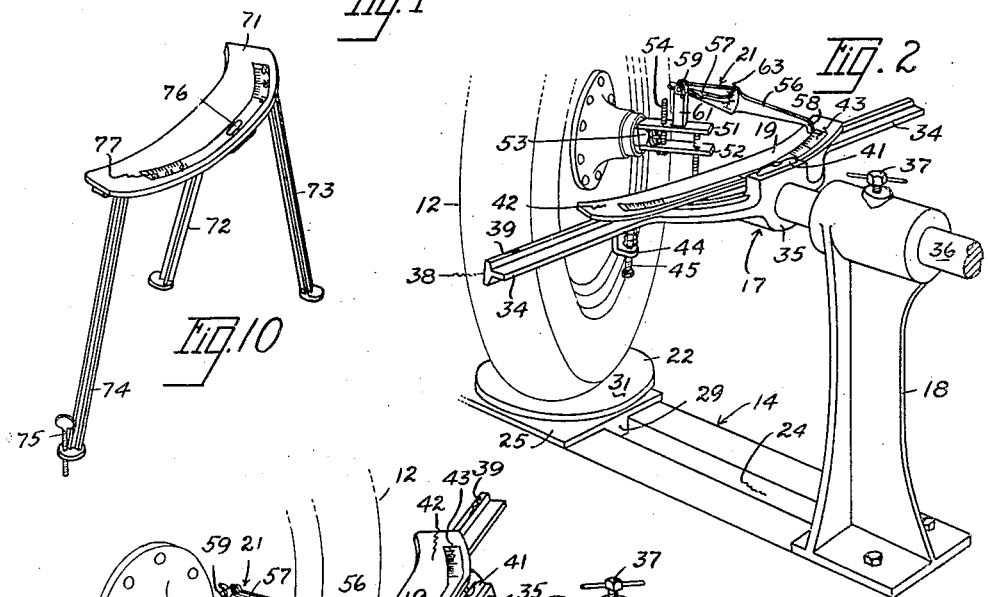
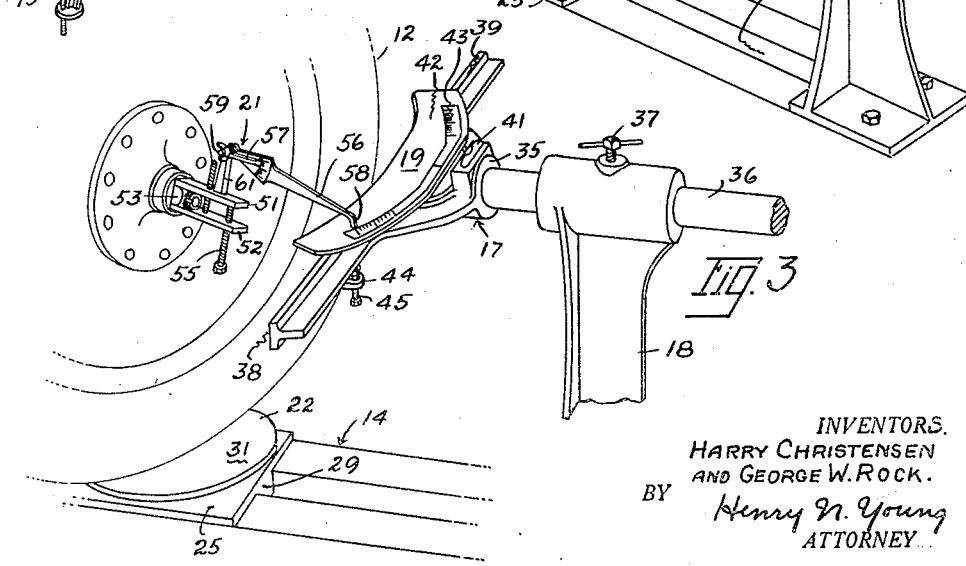
INVENTORS.
HARRY CHRISTENSEN
AND GEORGE W. ROCK.
BY Henry N. Young
ATTORNEY Sept. 19, 1933.    H. CHRISTENSEN ET AL    1,927,488
WHEEL GAUGING DEVICE
Filed Jan. 16, 1931    2 Sheets-Sheet 2
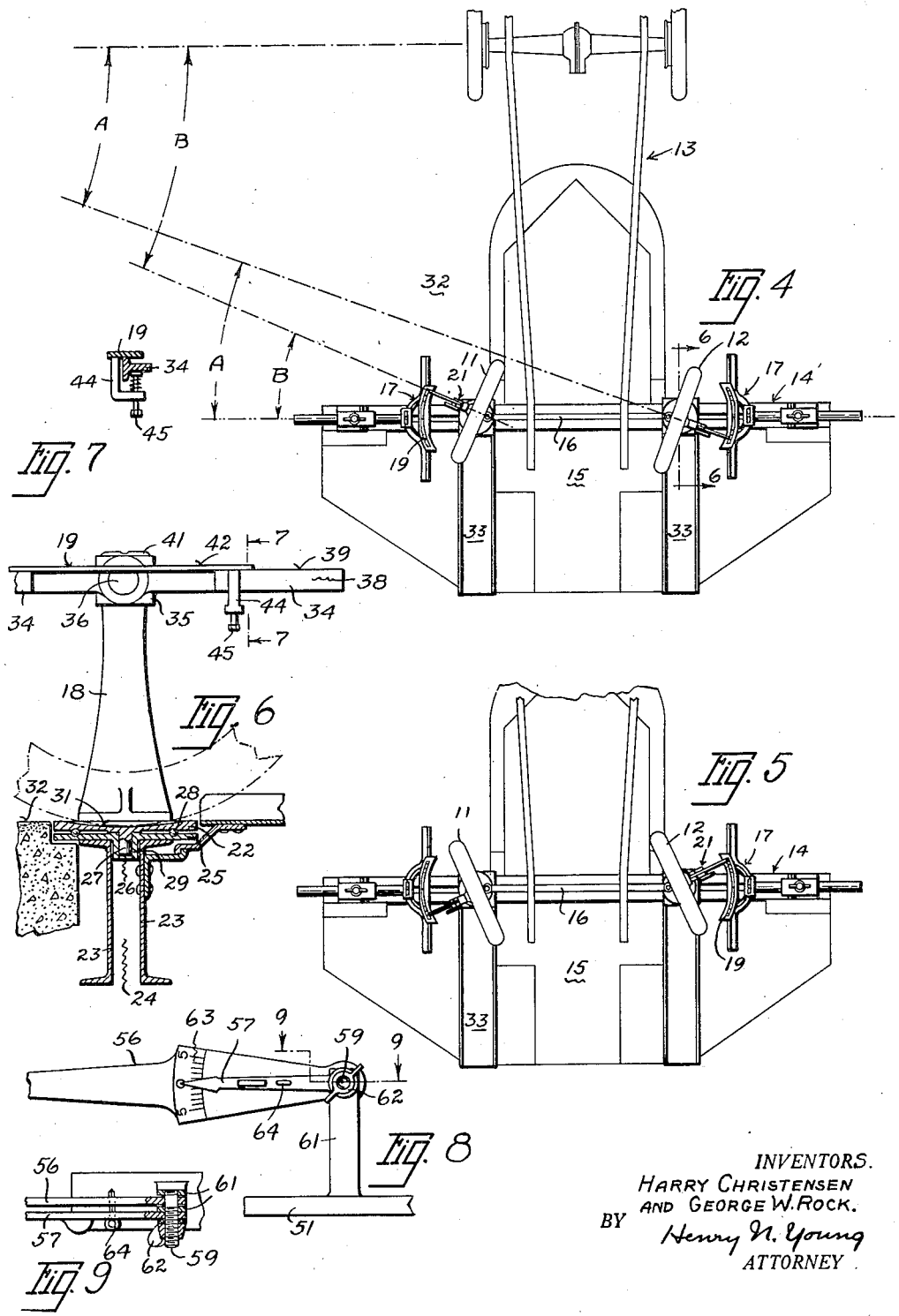
INVENTORS.
HARRY CHRISTENSEN
AND GEORGE W. ROCK.
BY Henry N. Young
ATTORNEY.

Patented Sept. 19, 1933

1,927,488

UNITED STATES PATENT OFFICE 1,927,488

WHEEL GAUGING DEVICE

Harry Christensen and George W. Rock, Oakland, Calif.

Application January 16, 1931. Serial No. 509,174

4 Claims. (Cl. 33—203)

The invention relates to a device for gauging various setting and alignment relations of dirigible wheels of automobiles and the like, whereby said wheels may be properly and most advantageously set in the vehicle assembly.

A general object of the invention is to provide improved apparatus for effecting the desired gauging operations.

A more specific object is to provide an improved means for gauging the turning radius relations of a pair of coactive dirigible wheels of a vehicle.

Another object is to provide for utilizing the aforesaid means in gauging the caster settings of the different wheels.

A further object is to provide an improved means for supporting the wheels for free steering movements between testing positions thereof whereby normal operating conditions and relations are arranged to exist during the test.

The device possesses other objects and features of advantage, some of which, with the foregoing, will be set forth or be apparent in the following description of typical embodiments of the invention which are illustrated in the accompanying drawings, in which, Figure 1 is a perspective view showing gauging apparatus embodying the invention as applied to dirigible front wheels of an automobile, the latter being shown fragmentarily and somewhat diagrammatically.

Figures 2 and 3 are enlarged perspective views respectively showing the mutual relations of the parts of the apparatus for different test positions of a wheel.

Figure 4 is a plan view showing the disposal of the dirigible wheels of the automobile in one of two extreme test positions thereof with respect to the apparatus.

Figure 5 is a fragmentary view similar to that of Figure 4 but showing the dirigible vehicle wheels in the other extreme position thereof.

Figure 6 is an enlarged fragmentary view of certain elements of the apparatus, the view being taken at 6—6 in Figure 4.

Figure 7 is a section at 7—7 in Figure 6.

Figure 8 is a fragmentary elevation of a pointed element of the apparatus.

Figure 9 is a section at 9—9 in Figure 8.

Figure 10 is a perspective view of a modified form of a portion of the apparatus.

As particularly illustrated in Figures 7 to 9 inclusive, the features of the present invention are incorporated in apparatus for use in gauging the camber, toe-in, caster, and turning radius relations of a pair of steering wheels of a vehicle; in the present instance, the gauging of the dirigible front wheels 11 and 12 of an automobile 13 is indicated. One element of the apparatus comprises a beam 14 spanning a usual mechanic's pit 15 and provided with means for supporting the automobile front over the beam 14 and with the front axle 16 parallel to the beam. Further elements of the apparatus are testing heads 17, standards 18 supporting said heads for certain required adjustments of position, gauging members 19 for mounting on said heads, and pointer assemblies 21 for mounting on the wheels being tested.

In making the various tests with apparatus of the present type, a free steering movement of the steering wheels is desirable. Heretofore, it has been a general custom to provide for the said free movement of steering wheels to be tested by lifting the wheels clear of any supporting surface by means of jacks or the like applied at the front vehicle axle; this device has possessed several disadvantages, however, notable among which is the necessity for adjusting the disposal of the front axle for parallelism with the rear vehicle axle, the time and extra equipment required for the aforesaid purpose, and the fact that effects to be tested are more or less altered in varying degrees depending on the amount of lift, vehicle wheelbase, etc. In accordance with the present invention, however, the foregoing and other difficulties are avoided by mounting turntables 22 directly on the beam 14 and for receiving the vehicle front wheels in the ground plane thereat.

As shown, the beam 14 comprises a pair of channels 23 disposed in spaced back-to-back relation with their webs vertical whereby a vertical slot 24 is defined between them. A base block 25 underlies each turntable 22 and rotatably receives in a central socket 26 thereof a trunnion 27 depending axially from the turntable. Ball-bearings 28 interposed between the turntables and their blocks 25 facilitate swivelling movements of the turntables about their axes. The base of each block 25 is formed to provide a depending and more or less rectangular lug or tongue 29 which is arranged to slidably engage the slot 24 while the blocks rest on and across the channels 23; in this manner, the blocks 25 are held against rotation while relatively shiftable to simultaneously receive wheels of variously spaced pairs thereof. Since the "gauges" of the wheels of vehicles to be tested are not all alike, the provision for relative adjustment of the two turntables is an important feature of the present device. To insure a centered contact of the wheel tires with the turntables, the upper faces 31 of the latter are concavedly cupped to have the point of maximum depression in the swiveling axes thereof, it being obvious that each wheel is held against an appreciable rolling rotation thereof during testing.

As particularly brought out in Figure 6, the turntable faces 31 are continuous with the floor surface 32 at the rearward pit edge thereof, and removable runways 33 are provided to span the pit portion forwardly of the beam 14. In this manner, the disposal of a vehicle for testing is facilitated, and the vehicle is supported on its wheels in normal running relation to the plane of the floor. For the purpose of testing with the present apparatus, said floor surface is preferably horizontal whereby the plane of support of the vehicle being tested is also horizontal.

Referring now to the structural features of the testing heads 17 and their standards 18, each head is shown as comprising a pair of mutually aligned arms 34 extending oppositely from a hub 35. Said hub is carried on the end of a cylindric bar 36 for rotative and axially adjustable engagement in a complementary and horizontal bore provided in the upper end of the standard 18. The different standards are arranged for fixed disposal at opposite ends of the beam 14, outwardly of the turntables 22, and to have the aforesaid bar-receiving bores in mutual alignment in an horizontal line. For securing the heads in adjusted position, set-screws 37 are mounted in the standard for engagement with the bars in the aforesaid bores.

Flat and mutually coplanar faces 38 are provided on those sides of the arms of a pair which face a wheel, said arm faces being hereinafter referred to as inner arm faces and being cooperative to define a constantly vertical reference plane opposite a wheel on the adjacent turntable. Corresponding edges 39 of the arms of each pair are aligned whereby to cooperatively define a straight-edge. For at least three tests to be made with the present apparatus, the line of the edges 39 as defining a side of the arms must preferably be horizontal, and means are accordingly provided for levelling said arms and said line. As particularly shown, the arm levelling means comprises a bubble level 41 fixedly mounted on the hub portion of the head parallel with the said arms whereby the leveling of said arms is facilitated.

In making the various tests with the present apparatus, it is necessary that the wheels 11 and 12 be in their straight-ahead position, at least initially, and such positioning of the wheels is arranged to be effected by use of the now-described apparatus. Having the arms of both heads levelled as described, and the wheels 11 and 12 mounted on the turntable 22, said wheels are so set with respect to the test plane defined by the inner arm faces 38 as to make equal horizontal angles therewith. In the present instance, the desired setting of the wheels is effected by measuring from corresponding and diametrically removed wheel or tire parts to the opposed arm faces 38, it being noted that when toe-in exists, as is usual in the steering wheels of automobiles and the like, the measured distance at the front of the wheel would exceed that at the back. If therefore, the simultaneous settings of the wheels are such that the difference between the aforesaid measured distances for one wheel corresponds to and equals that for the other, the wheels are known to be in an operative straight-ahead position.

It will now be particularly noted that when the wheels are set for straight-ahead, the aforesaid difference between front and rear measurements from a wheel to the arms of a testing head is a measure of the toe-in for the wheels. In this manner, the initial setting for the further tests actually effects a measure of toe-in. Should the latter be other than desired, correction may be simply effected by appropriately changing the length of the steering rod connecting the spindle arms for the different coactive wheels.

Camber may be simply measured while the wheels are disposed in straight-ahead position, by turning the testing heads to dispose the arms thereof vertically, and thereafter measuring to the reference plane as of faces 38 as for toe-in. In this case, the difference of readings for each wheel is a measure of the camber thereof. Correction or change of camber is effected by appropriately bending the axle 16, it being noted that each of a pair of coactive steering wheels is arranged to be individually tested by the present method.

The gauging members 19 are shown as plate elements having flat upper faces 42, and are arranged for removable and adjusted mounting on and along the arms 34 of each head. Said upper faces 42 of the members 19 are arranged to parallel the arm edges 39 when said members are mounted on the heads 17, whereby the said faces may be levelled with the arms which carry them. An arcuate graduated scale 43 is provided at the test plate face 42, said scale having its zero point mediately thereof. As particularly shown, L-shaped extensions 44 depend from the plates 19 and carry set screws 45 for operation against the bottoms of the arms 34 for clamping the plates to the arms, the arrangement preferably permitting a solely longitudinal adjustment of said members along the arms.

The pointer assemblies 21 are provided for use with the elements 19 for gauging caster and turning-radius relations of the wheels, and are arranged for mounting on the different wheels. As particularly shown in Figures 2, 3, 8 and 9, each said assembly comprises clamp bars 51 and 52 coactive for a gripping engagement with a nut 53 of a wheel-carrying spindle, said bars suitably connected by bolts 54 and 55 for the purpose. A gauging arm 56 and a reference arm 57 are pivotally mounted on a said clamp bar, the arm 56 having a pointer extremity 58 arranged for movement over the scale 43 of the adjacent member 19 as a means to determine the angular degree of turning from straight-ahead of the wheel which carries it. As particularly shown, the inner ends of the arms 56 and 57 are pivotally mounted on a pivot bolt 59 engaged through the free outer end of a post 61 extending transversely from the clamp bar 51, said arms arranged for pivotal movement about an axis perpendicular to the wheel axis and in a common plane including said axis, when the pointer assembly is mounted on the wheel.

Before the gauging of caster and turning radius may be effected, certain specific settings of the apparatus must be made while the wheels 11 and 12 are in their before-described straight-ahead position. Having the pointer assemblies positioned for the movement of the arms 56 and 57 in a vertical plane and the members 19 mounted on the heads 17, said heads are adjusted in their standards 18 to dispose the scales 43 beneath the pointers 58, and are then levelled by means of the bubble levels 41. The members 19 are then longitudinally adjusted, if necessary, to dispose the zero points of the scales 43 beneath the pointers 58, it being noted that the scales 43 are arcuate, and that the centers of curvature of said scales are arranged to lie substantially in the axis of turning of the respective wheels when the members 19 are adjustedly positioned as described. This latter disposal of the scales is understood to make possible direct readings of the degree of turning of both dirigible wheels from the straight-ahead positions thereof.

It will now be noted that to maintain the best coactive steering function of a pair of dirigible wheels of an automobile or the like when the vehicle guided thereby is travelling in a curved path, it is desirable that said wheels simultaneously travel in curves having a common center, said center moving on a line more or less coinciding with the axis of the nondirigible vehicle wheels as the degree of turning is varied. The required angularity of the two wheels with respect to their straight-ahead positions is obviously predetermined for different coactive settings thereof and in accordance with the wheel base and lateral spacing of the dirigible wheels of a vehicle.

Referring now to Figure 4, it is noted that in said figure the wheels 11 and 12 are set as for a right turn of the vehicle, and have been turned through angles designated B and A respectively, the angle B being the larger for providing the desired operating relation of said wheels. The turning radius relation is conveniently measurable in terms of the difference between said angles, said difference varying, of course, for different degrees of turning as well as with the wheelbase and vehicle gauge. For using the present device, the correct values for angle B are determined for an assumed value of A, this information preferably covering each make and model of vehicle to be tested whereby the device may be universally applied; said information would be furnished with the apparatus. In practice, the angle A may, for example, be taken as twenty-five degrees, in which case the angle B will approximate twenty-eight degrees.

In making the turning radius test with the present apparatus, angle A is set on the "outside" wheel, and angle B read for the other, or "inside," wheel. Should the readings show an improper angle B, correction is usually made by appropriately changing the angular relation of the wheel spindle and spindle arm of the wheel for which the angle B has been read. These readings and corrections are made separately for each dirigible wheel, as is indicated in Figures 4 and 5 wherein right- and left-turn testing positions of the wheels 11 and 12 are respectively indicated.

It will now be noted that, owing to the usual caster provided in the king pins which secure the wheel spindles to the vehicle axle, a gauging arm 56, if rigidly extending from its wheel, will move in a plane oblique to the horizontal and the plane of the scale 43 which underlies its pointer end 58. In this manner, the difference in the distances from the pointer tip to the scale plane for different angular settings of a wheel may be taken as a measure of the caster of that wheel, the desired value of said difference for a given angular range of the wheel being predetermined. To minimize the necessary settings for the caster measurements, said range may well be that for the movement of a wheel between its previously described positions for gauging turning radius whereby the turning radius and caster measurements may be made at the same settings. It is noted that the present method of determining caster does not involve a movement of the arm 56, and means to be hereinafter described are provided for releasably and adjustably securing said arm in fixed relation to the wheel.

With the present pointer assemblies 21, however, the caster of the different wheels is particularly arranged to be angularly measured, and to that end each arm 56 is permitted a free pivotal movement about the pivot 59 and in a vertical plane whereby its pointer end 58 may constantly rest on and move over the face 42 of the underlying member 19 at or adjacent the scale 43 thereof; for permitting this movement of the arm 56, the inner end thereof is shown (Figs. 8 and 9) as disposed in a slot at the upper end of the post 61 and pivotally engaging a portion of the pivot member 59 which traverses said slot. The inner end of the arm 57 is disposed against an outer face of the post 61 and a protruding and threaded pivot portion extends transversely therethrough and therefrom. A wing-nut 62 engaging said protruding pivot portion is provided for clamping the arm end against the post and in fixed adjusted relation thereof.

The arm 57, it will now be noted, constitutes a pointer for movement over an angle scale 63 provided on the opposite face of the arm 56 whereby the angular relation of the two arms may be gauged. When the apparatus is disposed as in Figure 4 or 5, and the pointer ends of the arms 56 rest on the respective members 19, the arms 57 may be fixed in place with their pointer ends in registration with the zero point of the scale 63, said zero point being mediate of the scale. In this manner, a swinging of the wheels to their other test positions will automatically effect a gauging of the angular displacements of the arms 56, said displacement being primarily due to caster. It will be understood that an appropriate value of a preferred said angular displacement for the given make of vehicle and angular wheel swing would be supplied with the apparatus, whereby the correctness of caster may be ascertained. Should the caster be found incorrect, correction thereof may be made either by appropriately twisting the axle or by inserting wedge shims between the vehicle spring and its perch on the axle. Since spring sag may cause improper caster conditions, the replacement of the front springs may also correct faulty caster relations.

Should it be desirable to prevent a free pivotal movement of the gauging arm 56, as when only turning radius is to be gauged, the said arm is arranged to be held fixed against rotation by means of a key 64 engageable through transverse and mutually alignable perforations in the arms 56 and 57; the key 64 is shown in its operative position in Figures 8 and 9. When the key 64 is in use, the gauging of caster may be effected as first described, namely, by measuring to the test surfaces of the members 19.

It will now be clear that with the present apparatus, the described measurements of toe-in, camber, turning radius and caster may all be effected with a minimum of settings and while the vehicle is in a single position thereof from which it may be directly driven. In this manner, the testing is facilitated and may be completed in a minimum of time. Another noteworthy feature of the present device is that the gauging elements may remain set in position while the indicated corrections are made whereby a constant gauging is afforded and over-correction may be avoided.

When only turning radius and caster are to be determined, a simplified mounting for the gauging plates may be utilized. Thus, as shown in the modification disclosed in Figure 10, a plate 71 is shown as directly supported on three legs 72, 73, and 74. The legs 72 and 73 depend from one plate end and the leg 74 from the other, and a screw 75 engaged through the foot of the leg 74 is provided for longitudinally levelling the plate. As shown, a bubble level 76 is mounted on the plate for use in levelling the same, and an arcuate scale 77 is provided on the upper and gauging face of the plate. A pair of the longitudinally levelled plates 71 may be used with the mounted pointer assemblies 21 for turning radius and caster determinations as are the plates 19.

It will be noted that for maximum accuracy in making tests with the present apparatus, the vehicle axle 16 should be horizontal. The latter condition may readily be checked by direct measurement from the axle to a channel 23, and will usually obtain if the wheel tires are of like size. Should checking disclose an error, adjustment may be made with pneumatic tires by appropriately deflating the tire of the wheel at the high end of the axle.

From the foregoing description taken in connection with the accompanying drawings, the advantages of the construction and method of operation will be readily understood by those skilled in the art to which the invention appertains, and while we have described the principle of operation, together with the device which we now consider to be the best embodiment thereof, we desire to have it understood that the device shown is merely illustrative, and that such changes may be made, when desired, as fall within the scope of the appended claims.

Having thus described our invention, we, claim as new and desire to secure by Letters Patent of the United States the following:

1. In wheel gauging apparatus of the character described, a member providing a plane reference face having an arcuate angle scale delineated thereon, means to mount said member in horizontal disposition and opposite a dirigible wheel to be gauged and with the center of curvature of said scale substantially in the steering axis of said wheel, a pointer mounted for movement with said wheel and over said scale whereby to gauge the displacement of said wheel between different steering positions thereof, said pointer being mounted for free movement in a vertical plane to have the free end thereof constantly engage said face as the wheel is moved between said positions thereof, and scale and pointer means on the arm and its mounting cooperative to measure any angular displacement of said pointer in said plane as the steering position of said wheel is changed.

2. In apparatus for gauging the operative setting of a dirigible wheel carried on a spindle, means providing a fixed reference surface, a pointer assembly for mounting on said spindle and comprising a gauging arm for engaging said reference surface, means to pivotally mount said arm on said spindle for movement solely in a plane including the spindle axis, and scale and pointer means on the arm and its mounting means cooperative to measure the angular movement of said arm in said plane.

3. In apparatus for gauging the operative setting of a dirigible wheel carried on a spindle, a member providing an upwardly facing and horizontal plane reference surface, a pointer assembly for mounting on said spindle and comprising clamp arms cooperative to secure said assembly to said spindle and a gauging arm pivoted to a said clamp arm for movement solely in a plane including the spindle axis, the free end of said gauging arm being arranged to gravitationally and constantly rest on said reference surface, and scale and pointer means on said gauging arm and said clamp arm cooperative to measure the angular movement of said arm in said plane.

4. In apparatus for gauging the operative setting of a dirigible wheel carried on a spindle, a gauging arm and means for pivotally mounting it on said spindle for adjustment solely in a vertical plane including the spindle axis, a member providing an upper reference face having an arcuate angle scale delineated thereon, support means mounting said member opposite the wheel and for adjustment longitudinally of the scale to dispose the member to have said face horizontal and the center of curvature of said scale substantially in the steering axis of said wheel and the free end of said gauging arm registering with a central zero point of the scale when the wheel is in a straight-ahead position thereof whereby the readings of said scale may be used for measuring toe-in and turning radius relations of the wheel, and scale and pointer means on the gauging arm and its mounting means cooperative to measure the angular movement of the arm in the said vertical plane of movement thereof for ascertaining caster relations of the wheel mounting.

HARRY CHRISTENSEN.
GEORGE W. ROCK.